(12) United States Patent
Covey et al.

(10) Patent No.: US 9,430,658 B2
(45) Date of Patent: *Aug. 30, 2016

(54) SYSTEMS AND METHODS FOR SECURE PROVISIONING OF PRODUCTION ELECTRONIC CIRCUITS

(71) Applicant: FREESCALE SEMICONDUCTOR, INC., Austin, TX (US)

(72) Inventors: Carlin R. Covey, Tempe, AZ (US);
Lawrence L. Case, Austin, TX (US);
Thomas E. Tkacik, Phoenix, AZ (US)

(73) Assignee: FREESCALE SEMICONDUCTOR, INC., Austin, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/571,637

(22) Filed: Dec. 16, 2014

(65) Prior Publication Data

US 2016/0171223 A1 Jun. 16, 2016

(51) Int. Cl.
*H04L 29/06* (2006.01)
*G06F 21/60* (2013.01)
*G06F 9/44* (2006.01)

(52) U.S. Cl.
CPC ........... *G06F 21/602* (2013.01); *G06F 9/4401* (2013.01)

(58) Field of Classification Search
CPC .................................................. G06F 21/602
USPC ......................................................... 713/189
See application file for complete search history.

(56) References Cited

U.S. PATENT DOCUMENTS

| 6,026,163 | A | 2/2000 | Micali |
| 6,285,991 | B1 | 9/2001 | Powar |
| 6,711,263 | B1 | 3/2004 | Nordenstam et al. |
| 6,970,562 | B2 | 11/2005 | Sandhu et al. |
| 7,017,041 | B2 | 3/2006 | Sandhu et al. |
| 7,424,610 | B2 | 9/2008 | Ranganathan |

(Continued)

FOREIGN PATENT DOCUMENTS

| JP | H11239124 A1 | 8/1999 |
| JP | 2004172865 A1 | 6/2004 |

OTHER PUBLICATIONS

Final Rejection mailed Oct. 31, 2014 for U.S. Appl. No. 13/601,987, 14 pages.

(Continued)

*Primary Examiner* — Longbit Chai
(74) *Attorney, Agent, or Firm* — Sherry W. Schumm

(57) ABSTRACT

To securely configure an electronic circuit and provision a product that includes the electronic circuit, a first entity (e.g., a chip manufacturer) embeds one or more secret values into copies of the circuit. A second entity (e.g., an OEM): 1) derives a trust anchor from a code signing public key; 2) embeds the trust anchor in a first circuit copy; 3) causes the first circuit copy to generate a secret key derived from the trust anchor and the embedded secret value(s); 4) signs provisioning code using a code signing private key; and 5) sends the code signing public key, the trust anchor, and the signed provisioning code to a third entity (e.g., a product manufacturer). The third entity embeds the trust anchor in a second circuit copy and causes it to: 1) generate the secret key; 2) verify the signature of the signed provisioning code using the code signing public key; and 3) launch the provisioning code. The OEM can authenticate the second circuit copy using the first circuit copy and a challenge/response protocol.

22 Claims, 5 Drawing Sheets

(56) References Cited

U.S. PATENT DOCUMENTS

| | | | |
|---|---|---|---|
| 7,437,568 B2 * | 10/2008 | Das-Purkayastha | G06F 21/552 380/277 |
| 7,630,493 B2 | 12/2009 | Sandhu et al. | |
| 7,685,424 B2 | 3/2010 | Walmsley et al. | |
| 7,734,915 B2 | 6/2010 | Neill et al. | |
| 7,895,437 B2 | 2/2011 | Ganesan et al. | |
| 2002/0078346 A1 | 6/2002 | Sandhu et al. | |
| 2003/0159036 A1 | 8/2003 | Walmsley et al. | |
| 2003/0174840 A1 | 9/2003 | Bogan | |
| 2006/0101288 A1 | 5/2006 | Smeets et al. | |
| 2008/0044026 A1 | 2/2008 | Walters et al. | |
| 2009/0132830 A1 | 5/2009 | Haga et al. | |
| 2010/0199077 A1 | 8/2010 | Case et al. | |
| 2010/0205433 A1 | 8/2010 | Neill et al. | |
| 2011/0010770 A1 | 1/2011 | Smith et al. | |
| 2013/0080764 A1 | 3/2013 | Khosravi et al. | |
| 2014/0064480 A1 | 3/2014 | Hartley et al. | |
| 2014/0068246 A1 | 3/2014 | Hartley et al. | |
| 2014/0164779 A1 | 6/2014 | Hartley et al. | |
| 2014/0205092 A1 | 7/2014 | Hartley et al. | |
| 2015/0095648 A1 * | 4/2015 | Nix | H04W 52/0235 713/170 |

OTHER PUBLICATIONS

Non-Final Rejection mailed Jan. 30, 2014 for U.S. Appl. No. 13/601,987, 23 pages.
Notice of Allowance mailed Feb. 17, 2015 for U.S. Appl. No. 13/601,987, 12 pages.
Restriction Requirement mailed Jun. 26, 2014 for U.S. Appl. No. 13/601,987, 7 pages.
Non-Final Rejection mailed Jul. 8, 2014 for U.S. Appl. No. 14/220,507, 21 pages.
Notice of Allowance mailed Feb. 20, 2015 for U.S. Appl. No. 14/220,507, 10 pages.
Non-Final Rejection mailed Sep. 26, 2014 for U.S. Appl. No. 13/601,993, 25 pages.
Restriction Requirement mailed Jun. 6, 2014 for U.S. Appl. No. 13/601,993, 7 pages.
Non-Final Rejection mailed Sep. 23, 2014 for U.S. Appl. No. 13/971,886, 48 pages.
Notice of Allowance mailed Mar. 10, 2015 for U.S. Appl. No. 13/971,886, 21 pages.
Certicom Corporation, "Certicom Security for Silicon Design Protection," pp. 1-2, Jul. 2006.
Certicom Corporation, "Defending Against Grey-market Fraud," Certicom Application Note, pp. 1-4, Feb. 2006.
Rowlings, Craig "Product Authentication Certicom AMS," NIST Product Authentication Information Management Workshop, pp. 1-14, Feb. 2009.
Notice of Allowance mailed Jul. 21, 2015 for U.S. Appl. No. 13/601,883, 11 pages.

* cited by examiner

SYSTEMS AND METHODS FOR SECURE PROVISIONING OF PRODUCTION ELECTRONIC CIRCUITS

BACKGROUND

To increase manufacturing capacity and/or economy, Original Equipment Manufacturers (OEMs) commonly outsource their product manufacturing to third-party manufacturers. In some cases, a product may include electronic circuits that the OEM sources from an integrated circuit (or "chip") supplier. Such chips may need to be configured during manufacture of the OEM products, for example, by blowing a set of one-time programmable fuses. After the chips have been configured, the product may need to be provisioned, for example, by loading OEM software and data onto the chips, where some of the software and data may be considered proprietary and confidential to the OEM.

Generally, it is impractical to require the chip supplier to configure the chips specifically for the OEM before sending them to the third-party manufacturer. Further, requiring the OEM to receive and configure the chips before they are sent to the third-party manufacturer adds extra delay and expense to the manufacturing process. Therefore, an OEM may prefer that the chip supplier sends the chips directly to the third-party manufacturer without passing through the OEM's hands, and the OEM requires the third-party manufacturer to configure the chips.

Such an arrangement may be economically advantageous and efficient. However, it carries several risks for the OEM. For example, the third-party manufacturer may configure the chip incorrectly, build the product incorrectly or may, without OEM authorization, build the products for entities other than the OEM. In addition, the third-party manufacturer may build more units than contracted by the OEM, and may sell the extra units without OEM knowledge. Potentially more damaging, the third-party manufacturer may release confidential OEM information in an unauthorized manner. Accordingly, what are needed are methods for verifying that the third-party manufacturer has properly configured the chips, and for provisioning electronic circuits in a secure, economical, and efficient manner.

BRIEF DESCRIPTION OF THE DRAWINGS

Embodiments of the invention relating to both structure and method of operation may best be understood by referring to the following description and accompanying drawings.

DETAILED DESCRIPTION

Figure 1:
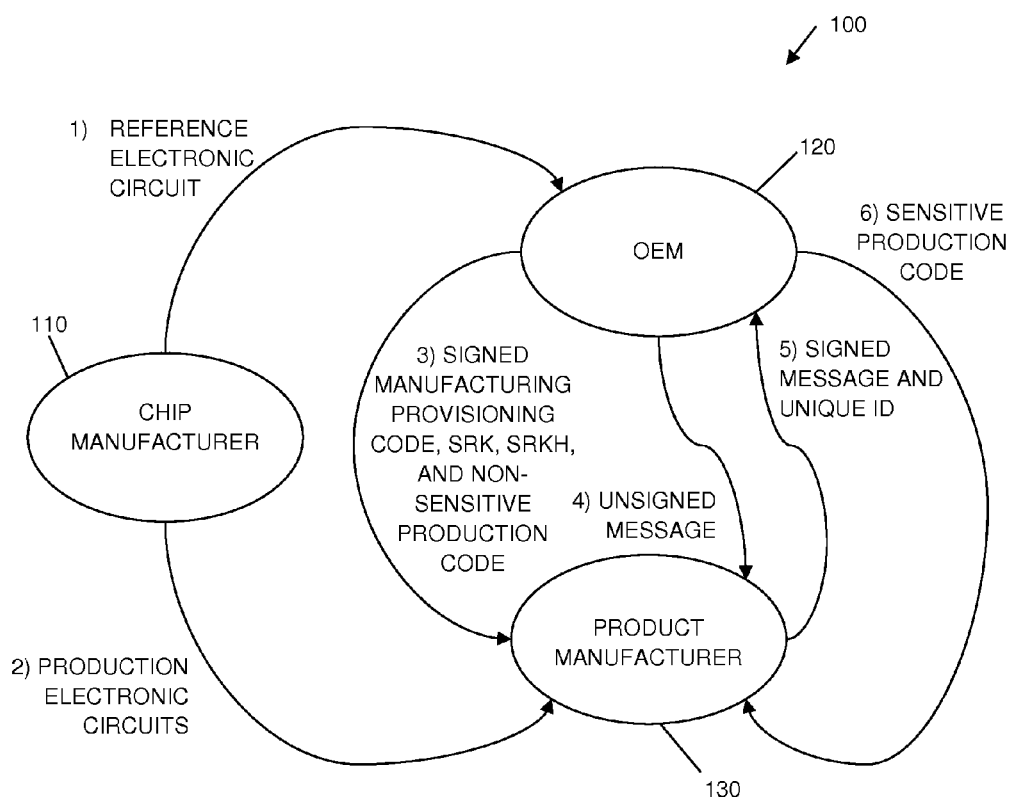
FIG. 1 is a schematic block diagram illustrating an embodiment of a production system that facilitates secure provisioning of electronic circuits.

In producing an electronic product, an original equipment manufacturer (OEM) may purchase various electronic components (including integrated circuit "chips," also referred to below as "electronic circuits") and non-electronic components from various sources, and have the components shipped to a third-party manufacturer (referred to herein as a "product manufacturer" or "contracted manufacturer"). The product manufacturer assembles the components and produces the product. At least one of the electronic circuits may be "configurable", and during the production process, the product manufacturer may be required to configure the electronic circuit, as will be described in detail below. In addition, the product manufacturer may be required to "provision" the product within which the electronic circuit is included, as will also be described in detail below. According to an embodiment, a specially designed and properly configured electronic circuit can be used to verify that the product manufacturer builds the product in accordance with the OEM contract.

As used herein, the term "configure" means to set a number of one-time programmable elements in the electronic circuit, such as blowing particular ones of a set of fuses, where a value is conveyed by which fuses are blown, and which fuses remain intact. Some configuration values may be readable by the electronic circuit during subsequent processes, and other configuration values may not be readable during subsequent processes. However, the configuration values, once established, are persistent and unchangeable, according to an embodiment. For example, configuring may include establishing various "immutable" (i.e., persistent and unchangeable) values in the chip (e.g., burning the values into fuses), among other things. As used herein, the term "provision" means to perform various customizations that make the product functional. For example, in various embodiments, and as will be described in more detail later, provisioning may include loading production code (or a production code image) into the product's memory (e.g., non-volatile memory), and loading other data into the product's memory (e.g., feature-enabling information), among other things. In most cases, the OEM may wish to verify that the product manufacturer builds the product only for the OEM and according to a contract between the OEM and the product manufacturer. For example, the OEM may wish to verify that the product manufacturer does not build more products than the contract specifies, and to verify that the product manufacturer does not sell products without knowledge of the OEM. The OEM also may wish to ensure that the product manufacturer does not release OEM confidential information ("OEM product design secrets") without authorization.

Embodiments of systems, circuits, components, and techniques disclosed herein enable an OEM to verify that a product manufacturer (or other party) builds only a quantity of products that the OEM desires, and to guarantee that the product manufacturer does not release OEM product design secrets, all without requiring the OEM to incur the added delays and expense of configuring, in a trusted facility (e.g., an OEM facility), a configurable electronic circuit that is to be included within the product. As will be described in more detail later, embodiments include electronic circuits (analogous to the above-described configurable "chips"), electronic devices (analogous to the above-described "products" that include the configurable "chips"), and systems that employ asymmetric public key cryptography and symmetric-key message signature techniques (e.g., using a keyedhash message authentication code (HMAC), a cipher-based message authentication code (CMAC), or another suitable message authentication code) to perform secure provisioning of the electronic circuits within the electronic devices.

As will be described in more detail below, asymmetric public key cryptography is used to validate provisioning code used during the provisioning process. Asymmetric public key cryptography involves the use of a mathematically related key pair, including a "private key" and a "public key" to sign and to verify a signature of information (e.g., code), respectively. More particularly, the private key may be used to sign information in order to produce signed information, and the public key may be used to verify the signature of the information. When public key cryptography is used in a system to ensure verifiable, one-way information transfer between two distinct entities (e.g., an OEM server and an electronic circuit within a device at a product manufacturer's fabrication site), the first entity may provide the public key to the second entity, while retaining the private key as a secret. The first entity may then sign the information with the private key, and send the resulting digital signature along with the information to the second entity. The second entity may then verify the signature using the information and the public key. In this manner, the second entity can verify the correctness of the information, as well as establish the identity of (i.e., authenticate) the sender (i.e., the first entity).

As will also be described in more detail below, HMAC cryptography, CMAC cryptography, or another cryptographic technique that uses a MAC (referred to generally as "MAC-based" cryptography) is used to verify a production electronic circuit that a product manufacturer configures. Using MAC-based cryptography, a first entity calculates a message authentication code (MAC) using a message and a secret cryptographic key, referred to below as a "secret signature key" or simply "secret key". When generating an HMAC signature, a cryptographic hash function (e.g., SHA-256, SHA-1, or another function) produces the MAC by condensing the message and the secret signature key. When generating a CMAC signature, a cryptographic encryption function (e.g. AES) produces the MAC by operating in CMAC mode. In either case, the MAC is sent to a second entity along with the message (unless the second entity already knows the message). The second entity, who also has the secret signature key, computes the MAC on the message using the secret signature key and the same MAC-based function as were used by the first entity, and compares the result computed with the received MAC. If the two values match, the message has been correctly received, and the second entity is assured that the first entity is valid.

According to various embodiments, asymmetric and MAC-based cryptographic techniques are used to securely configure an electronic circuit and provision a device that is being manufactured by a product manufacturer, including performing a chip authentication process and securely sending production code from the OEM to the product manufacturer. To perform these processes, an embodiment of a production method involves using a code signing key pair (which includes a "code signing public key" and a "code signing private key"), and a "secret signature key" that is derived from the code signing public key. As will be described in more detail below, during manufacture of a product at a product manufacturer's site, an electronic circuit in possession of the product manufacturer (referred to herein as a "production electronic circuit") contacts the OEM (e.g., an OEM server) to request download of provisioning information (e.g., a production code image). Prior to downloading the provisioning information, and as will be described in detail below, the OEM provides the product manufacturer with configuration information that the product manufacturer uses to configure (or customize) the production electronic circuit and prepare it for use in a product. The OEM server and the production electronic circuit thereafter exchange information that enables the OEM server to verify that the product is authorized for provisioning. As will also be described in detail below, the OEM server uses an identical copy of the electronic circuit in its possession (referred to herein as a "reference electronic circuit") to carry out the verification process for the production electronic circuit. Successful provisioning relies on the ability of the production electronic circuit and the reference electronic circuit to derive the same secret signature key.

A description of a method of manufacturing and configuring an electronic circuit, and provisioning a product that includes the electronic circuit will now be given in conjunction with FIG. 1, which is a schematic block diagram illustrating an embodiment of a production system 100 that facilitates secure configuration and provisioning of circuits, systems, and devices in a potentially untrusted environment. FIG. 1 should be viewed in parallel with FIG. 2, which is a flowchart of a method for performing secure configuration and provisioning, according to an embodiment. FIG. 1 illustrates three entities that may be involved in the embodiment of the secure configuration and provisioning method illustrated in FIG. 2. For example, the entities may include a "chip" manufacturer 110, an OEM 120, and a product manufacturer 130. In addition, FIG. 1 indicates electronic circuits and various types of code and other information that are exchanged between the chip manufacturer 110, the OEM 120, and the product manufacturer 130 in performing an embodiment of the method. Those of skill in the art would understand, based on the description herein, that more or fewer distinct entities may be involved in the below-described manufacturing and provisioning process.

In general, the OEM 120 is responsible for designing a product that includes an electronic circuit manufactured by the chip manufacturer 110. Ultimately, the product (including the electronic circuit) will be manufactured by the product manufacturer 130. Product design by the OEM 120 includes producing various types of code that will be executed by the electronic circuit during provisioning of the product and during normal operation of the product (e.g., "in the field"). As will be described in more detail later, the OEM 120 more specifically may be responsible for producing at least three types of code, which will be loaded onto and/or accessed by the electronic circuit. The code types produced by and/or provided by the OEM 120 are referred to herein as "manufacturing provisioning code" (embodied as a "manufacturing provisioning code image"), "reference verification code" (embodied as a "reference verification code image"), and "production code" (embodied as one or more "production code images").

In general, the manufacturing provisioning code is executed on a "production" electronic circuit to control the process of provisioning the product that includes the "production" electronic circuit (e.g., an electronic circuit in the possession of the product manufacturer 130). For example, and as will be explained in more detail below, the manufacturing provisioning code may be configured to perform some or all of the following functions: a) coordinate generation of a signed message; b) establish a provisioning channel with the OEM 120; and c) coordinate download of production code over the provisioning channel. Similarly, the reference verification code is executed in a reference electronic circuit (e.g., an electronic circuit in the possession and/or control of the OEM 120, and which is installed in a reference circuit board that is communicably coupled with the OEM server) and is configured to verify the signature over signed messages received while provisioning a product that includes a "production" electronic circuit. For example, and as will be explained in more detail below, the reference verification code may be configured to perform the following set of functions: a) coordinate generation of a signed message; and b) communicate the message signature to the OEM server. Alternatively, the reference verification code may be configured to perform the following set of functions: a) coordinate generation of a signed message; b) receive a message signature from the OEM server; c) compare the generated signature with the received signature; and d) provide an indication to the OEM server of whether or not the generated signature and the received signature match.

The production code includes code that is executed by the electronic circuit during normal operations of the product within which the electronic circuit is incorporated. According to an embodiment, the production code may include a "non-sensitive" portion of code and a "sensitive" portion of code. As will be described in more detail below, the OEM 120 may provide the non-sensitive production code to the product manufacturer 130 over a non-secure or "clear" communication channel, and the OEM 120 may provide the sensitive production code to the product manufacturer 130 over a secure communication channel (e.g., an SSL connection), in an embodiment. In an alternate embodiment, the OEM 120 may provide both the sensitive and non-sensitive portions of the production code to the product manufacturer 130 over a secure channel. In such an embodiment, the production code may not be separated into sensitive and non-sensitive portions.

In order to securely download the sensitive production code image and perform other provisioning setup tasks, the chip manufacturer 110 may develop a fourth type of code, referred to herein as "secure boot code" (embodied as a "secure boot code image"). As will be described in more detail later, the secure boot code may be configured to perform some or all of the following functions: a) coordinate cryptographic key generation; b) generate a hash of code (e.g., which may be the provisioning code) to be booted on the electronic circuit; and c) verify the code to be booted on the electronic circuit.

The product manufacturer 130 is responsible for producing the product according to specifications of the OEM 120. This includes receiving the production electronic circuits from the chip manufacturer 110, receiving other product components from other sources, assembling the components and the production electronic circuits, configuring the production electronic circuits, and provisioning the product (including loading the manufacturing provisioning and production code images into the product to be executed by the electronic circuit). The production method embodiments described herein relate to the configuration of the electronic circuit and provisioning of the product during production of the product.

Figure 2:
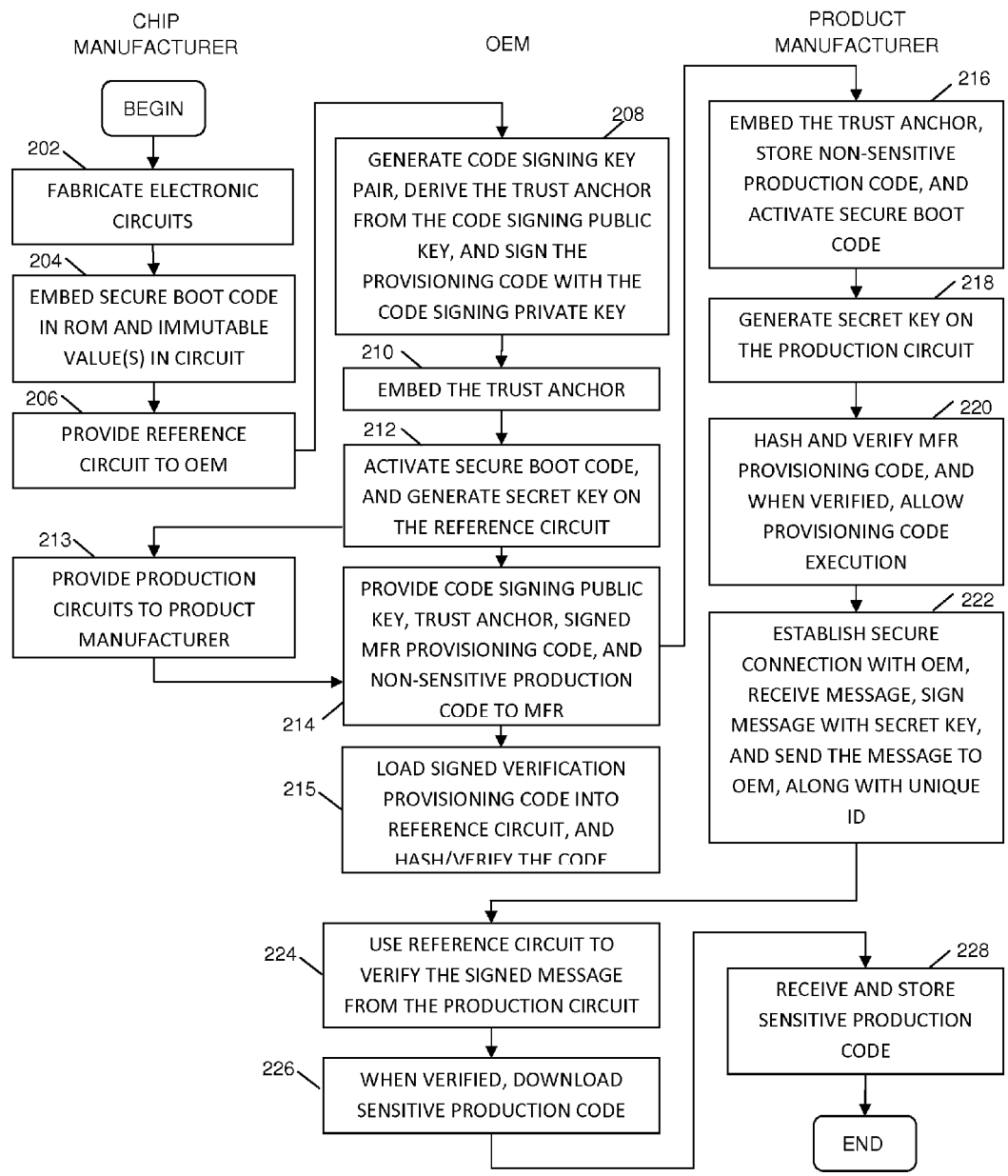
FIG. 2 is a flowchart of a method for performing secure provisioning, according to an embodiment.

Various production method embodiments may be more clearly described with reference to FIG. 2. FIG. 2 is divided into three columns, one each for the chip manufacturer 110, the OEM 120, and the product manufacturer 130. Actions performed either by a particular entity or actions performed by an electronic circuit while in the possession of the particular entity are aligned within their respective columns. Blocks 202-215 represent processes that are performed by the chip manufacturer 110 and the OEM 120 prior to product production by the product manufacturer 130, and blocks 216-228 represent processes that occur during electronic circuit configuration, product production and product provisioning by the product manufacturer 130 and the OEM 120.

The method may begin, in block 202, when the chip manufacturer 110 fabricates a plurality of electronic circuits (various embodiments of which will be described later in conjunction with FIG. 3). Each electronic circuit may include one or more integrated circuits and other components, and may be embodied as a System-on-a-Chip (SOC), a System-In-Package (SIP), and/or a system that is implemented using multiple packaged devices (e.g., assembled on one or more printed circuit boards).

In block 204, the chip manufacturer 110 embeds the secure boot code in multiple copies of the electronic circuit (e.g., in a masked read only memory (ROM) of the electronic circuits). In addition, the chip manufacturer 110 may perform initial configuring of the electronic circuit, for example, by storing a unique identifier (ID) in non-volatile storage of each copy of the electronic circuit. According to an embodiment, the chip manufacturer 110 also embeds one or more additional immutable "secret values" in one or more reference electronic circuits that the OEM will use during configuration and provisioning, and also in a set of the electronic circuits that an OEM has authorized for configuration and provisioning (e.g., production electronic circuits), along with one or more electronic circuits that the OEM will use during the provisioning process (e.g., reference electronic circuits). For example, the set of electronic circuits within which identical secret values are embedded may include all electronic circuits having a same part number, all electronic circuits purchased by a particular OEM, or all electronic circuits that a particular OEM has purchased for inclusion in a particular product or set of products. In this manner, different sets of secrets may be embedded in sets of electronic circuits intended for different part numbers, different OEMs, and/or different products.

According to a specific embodiment, the chip manufacturer 110 embeds three secret values in multiple copies of the electronic circuit. As will be explained in more detail later, a first secret value may be embedded in logic gates, a second secret value may be burned into a set of fuses, and a third secret value may be embedded in protected non-volatile memory (e.g., in the secure boot code embodied in the masked ROM). Although the embodiments described herein describe embedding three specific types of secret values in the electronic circuit, other embodiments may include embedding more or fewer than three secret values and/or embedding different types of secret values in the electronic circuit.

In block 206, the chip manufacturer 110 provides one or more reference electronic circuits to the OEM 120 (exchange "1" in FIG. 1) for the OEM 120 to use during the provisioning process. To avoid confusion, only a single reference electronic circuit is referred to below. However, multiple reference electronic circuits may be used during the below-described processes to provide redundancy, parallel provisioning capacity, and so on. In any event, the reference electronic circuit is identical to production electronic circuits that the chip manufacturer 110 will send to the product manufacturer 130 (e.g., in block 213), and both the reference electronic circuit and the production electronic circuits include the same embedded secrets and secure boot code. As will be described in more detail later, the reference electronic circuit (and/or possibly copies thereof) is used later by the OEM 120 to perform a verification process in conjunction with provisioning a product that includes the production electronic circuits (e.g., in block 224, described later). Because the embedded secret values are the same in all copies of the electronic circuit, the reference electronic circuits may be distinguished from each other and from the production electronic circuits by their unique IDs, but not by their embedded secret values.

According to an embodiment, the reference electronic circuit provided by the chip manufacturer 110 to the OEM 120 includes the secure boot code, the unique ID, and the one or more additional secret values discussed above. Upon receiving the reference electronic circuit from the chip manufacturer 110, the OEM 120 may connect the reference electronic circuit to a computer system of the OEM 120 (e.g., via a USB link, a JTAG interface, or any other suitable connection).

As used herein, the term "computer system" means one or more networked computers (e.g., servers) and/or non-networked computers, as appropriate for the tasks being performed by the system. The term "OEM computer system" means a computer system that is at an OEM facility and controlled by the OEM, or a computer system of a third party that is authorized by the OEM to perform the functions of an OEM computer system that are discussed herein. Similarly, the term "product manufacturer computer system" means a computer system that is at a product manufacturer facility and controlled by the product manufacturer, or a computer system of a third party that is authorized by the product manufacturer or the OEM to perform the functions of a product manufacturer computer system that are discussed herein. In addition, reference to various actions performed by an OEM 120 or a product manufacturer 130 includes acts performed by authorized third parties of an OEM 120 or a product manufacturer 130.

According to an embodiment, to connect the electronic circuit to the OEM computer system, the reference electronic circuit may be inserted into an appropriate socket of a "reference circuit board" (i.e., a printed circuit board that is configured to receive the reference electronic circuit, and to facilitate communications between the reference electronic circuit and the OEM computer system). The socket includes multiple conductors which, among other things, enable the board to provide power and a ground reference to the electronic circuit, and also to exchange control signals and data between the reference circuit board and the electronic circuit. Along with the socket, the reference circuit board also includes one or more communication ports, which may be coupled to the OEM computer system to enable the reference circuit board and the OEM computer system to communicate with each other. For example, the communication port(s) may be selected from one or more USB ports, JTAG ports, Ethernet ports, UART ports, serial ports, and so on. In addition, the reference circuit board may include memory and additional hardware that enables the reference circuit board to carry out various other tasks.

In block 208, the OEM computer system may coordinate generation of a code signing key pair consisting of a code signing public key and a code signing private key. For example, the OEM computer system may generate the code signing private and public keys using a random number generator. In various embodiments, the code signing private and public keys may be RSA (Rivest-Shamir-Adelman), ECC (elliptic curve cryptography), or other types of public-key cryptographic keys. The code signing public and private keys are stored in the OEM computer system, and retained for later use. Importantly, the code signing private key is maintained in secret by the OEM 120 (e.g., the OEM 120 may refrain from providing the code signing private key to the chip manufacturer 110, the product manufacturer 130, or any other external entity).

As used herein, the code signing public key is referred to as a Super Root Key (SRK). According to an embodiment, the OEM computer system creates a hash of the SRK, which is referred to as a Super Root Key Hash (SRKH). In some embodiments, the SRKH serves as a "trust anchor," which is stored in the electronic circuit during the configuration process, and used in the subsequent product provisioning process. In other embodiments, the trust anchor may be the SRK or some other value derived from the SRK. Although the description below tends to refer to the trust anchor and the SRKH synonymously, it should be understood that the trust anchor may be a value other than the SRKH.

According to an embodiment, the OEM signs the manufacturing provisioning and reference verification code using the code signing private key, thus creating a first digital signature of the manufacturing provisioning code and a second digital signature of the reference verification code. The first digital signature may be appended to the manufacturing provisioning code, and the second digital signature may be appended to the reference verification code. The combination of the manufacturing provisioning or reference verification code and its digital signature is referred to herein as the "signed manufacturing provisioning code" or the "signed reference verification code," respectively.

In block 210, the OEM 120 configures the previously-calculated trust anchor (e.g., the SRKH) in the reference electronic circuit in a non-volatile manner. For example, according to an embodiment, the OEM 120 may burn the trust anchor into a set of fuses of the reference electronic circuit. By burning the trust anchor into fuses, not only is the value of the trust anchor rendered immutable, but its location also is permanently established. In block 212, the OEM computer system invokes (or activates) the secure boot code stored in the reference electronic circuit to cause key derivation logic of the electronic circuit to generate a secret key using a combination of the trust anchor and the multiple secret values. This private key is referred to herein as a "secret key". According to an embodiment, the secret key may be used in a MAC-based cryptographic process, and thus the secret key may be referred to as a "secret signature key". It should be understood that other types of secret keys used in analogous cryptographic processes alternatively could be used. In any event, the reference electronic circuit stores the secret signature key in secure storage on the reference electronic device (e.g., in a protected register). The secret signature key is inaccessible to all but the message signing logic of the electronic circuit and, in some embodiments, verification logic of the electronic circuit. The secret signature key is inaccessible to entities outside of the electronic circuit (e.g., including the OEM server).

Production of a product that includes the electronic circuit may begin with the performance of blocks 213 and 214. More specifically, in block 213, the chip manufacturer 110 provides multiple production electronic circuits to the product manufacturer 130 (exchange "2" in FIG. 1). According to an embodiment, each of the production electronic circuits provided by the chip manufacturer 110 to the product manufacturer 130 also includes the secret values, the secure boot code, and the unique ID. Upon receiving the production electronic circuits for production from the chip manufacturer 110, the product manufacturer 130 may connect each production electronic circuit to a computer system within the product manufacturer's facility (referred to herein as a "product manufacturer computer system", which may include a product manufacturer server, for example). Each production electronic circuit may be connected to the product manufacturer computer system via a "production circuit board" (i.e., a printed circuit board that is configured to receive the production electronic circuit, and to facilitate communications between the production electronic circuit and the product manufacturer computer system) and a USB link, a JTAG interface, or any other suitable connection, for example. In an alternate embodiment, prior to configuration and provisioning, a production electronic circuit may be assembled within a socket of a product that is being manufactured, and the product may include an interface that is configured to be connected to the manufacturing computer system. In such an embodiment, a distinct production circuit board may not be utilized for configuration and provisioning.

In block 214, a channel may be established between the OEM computer system and the product manufacturer computer system, and the OEM computer system may provide the full code signing public key (e.g., the SRK), the trust anchor (e.g., the SRKH), the signed manufacturing provisioning code, and non-sensitive portions of the production code to the product manufacturer computer system (exchange "3" in FIG. 1), in an embodiment. The channel may be an unsecured or "clear" channel, in an embodiment. Alternatively, the channel may be a secure channel (e.g., an SSL channel). Thus, in various embodiments, the code signing public key, the trust anchor, the signed manufacturing provisioning code, and the non-sensitive portions of the production code may be sent "in the clear" or securely. In an alternate embodiment, the OEM computer system may provide the code signing public key without the trust anchor, and the product manufacturer may derive the trust anchor (e.g., the SRKH) from the code signing public key.

As will be described in more detail later in conjunction with blocks 222 and 224, the OEM computer system will use the reference electronic circuit (e.g., while it is installed in the reference circuit board) during the process of provisioning the production electronic circuits. In block 215, which may be performed before, after, or in parallel with blocks 213 and/or 214, the OEM 120 prepares the reference electronic circuit (or a copy thereof) for use during the provisioning process. For example, this may involve the OEM loading the previously-mentioned signed reference verification code into the reference electronic circuit, and causing the reference electronic circuit to re-generate the secret signature key (e.g., in the same manner as was done in block 212). The secure boot code on the reference electronic circuit may verify the reference verification code signature supplied by the OEM 120 using the code signing public key (i.e., the SRK). Once the secure boot code has verified the reference verification code, the secure boot code may launch the reference verification code for future use during the provisioning process (e.g., in block 224, discussed later).

In block 216, with the secure boot code inactivated on the production electronic circuit, the product manufacturer 130 configures the production electronic circuit with the trust anchor (e.g., by burning the SRKH into fuses of the electronic circuit). In addition, the product manufacturer 130 stores the non-sensitive production code in non-volatile memory of the product, which may include flash memory, EPROM, or other storage that is accessible to the production electronic circuit and/or other processing components of the product. In some cases, the product manufacturer 130 may store all or portions of the non-sensitive production code in non-volatile memory of the production electronic circuit.

The product manufacturer computer system then activates the secure boot code on the production electronic circuit.

In block 218, the secure boot code causes the key derivation logic of the electronic circuit to generate the secret signature key using the combination of the trust anchor and the multiple secret values embedded in the electronic circuit. When the trust anchor has the same value as calculated by the OEM 120 in block 208, the multiple secret values are the correct values as embedded by the chip manufacturer 110 in block 204, and the secure boot code has been activated, the secret signature key generated in block 218 by the production electronic circuit will be identical to the secret signature key generated in block 212 by the reference electronic circuit, indicating that the production electronic circuit is authentic and has been configured correctly (i.e., the trust anchor is correct). Otherwise, the secret signature key generated in block 218 will not match, indicating that the production electronic circuit is not authentic and/or that the trust anchor is not correct. In any event, the production electronic circuit stores the secret signature key in a secure location on the production electronic circuit (e.g., in a protected register).

The trust anchor and the secret values embedded in the production electronic circuit cause the key derivation logic to generate a specific secret signature key. Even if the secret values were the same, different trust anchors will cause the key derivation logic to generate different secret signature keys. This allows a secret signature key to be made specific to a particular OEM 120 and to a specific product. In an embodiment, the trust anchor and the secret values are the same in the reference electronic circuit and in each copy of the production electronic circuit that are to be included within a specific product, and thus the reference electronic circuit and each production electronic circuit will derive the same secret signature key. Because the trust anchor and the secret values are immutable (i.e., fixed and not changeable), the reference and production electronic circuits will generate the same secret signature key each time they are turned on. It is the combination of secret values common to all copies of the electronic circuit and the public but immutable trust anchor, which allows a production electronic circuit to generate a secret signature key that the OEM 120 can trust to be correct.

In block 220, the secure boot code on the production electronic circuit performs a derivation operation (e.g., a hashing operation) on the code signing public key (e.g., the SRK) supplied by the OEM 120 (in block 214), and compares the result with the trust anchor stored in the production electronic circuit (e.g., in fuses), thus verifying (or authenticating) the code signing public key against the trust anchor. In addition, the secure boot code verifies the manufacturing provisioning code signature supplied by the OEM 120 (in block 214) using the code signing public key (e.g., the SRK). Once the secure boot code has verified the code signing public key and the provisioning code signature, the secure boot code launches the manufacturing provisioning code. If the code signing public key and/or the manufacturing provisioning code signature is not properly verified, the manufacturing provisioning code will not be executed, and the provisioning process will fail.

In block 222, assuming that the code signing public key and the manufacturing provisioning code signature have been properly verified, the manufacturing provisioning code establishes a connection between the production circuit board (or the product manufacturer's product that contains the production electronic circuit) and the OEM computer system (referred to herein as a "provisioning channel").

According to an embodiment, the provisioning channel may be a secure channel (e.g., an SSL connection), although the provisioning channel may be unsecured, as well. Desirably, the provisioning channel is secure for at least the period that the OEM computer system downloads sensitive production code and/or other sensitive OEM information to the production electronic circuit over the provisioning channel (e.g., in block 226, described later). Alternatively, the sensitive production code and other sensitive OEM information could be encrypted prior to sending it to the production electronic circuit.

Over the provisioning channel, the OEM computer system sends the production electronic circuit a "challenge" message (exchange "4" in FIG. 1), in an embodiment. For example, the challenge message may include a value that is not repeated (e.g., a value based on a current time) or a value that is statistically unlikely to be repeated (e.g., a relatively large random number). In an alternate embodiment, the challenge message may have been previously stored within the production electronic circuit, or the production electronic circuit may derive the challenge message or use its unique ID as part of the challenge message. Either way, the manufacturing provisioning code prepares a "response" message. According to an embodiment, the manufacturing provisioning code prepares the response message by concatenating the challenge message and the unique ID of the production electronic circuit, and causing the message signing logic of the electronic circuit to generate a signed response message using the secret signature key derived in block 218, where the signed response message includes the concatenated message and a signature of the concatenated message (referred to as a "message signature"). The manufacturing provisioning code then causes the production electronic circuit to send the signed response message (or at least the message signature) to the OEM computer system over the provisioning channel (exchange "5" in FIG. 1). In an alternate embodiment, the manufacturing provisioning code may exclude the unique ID from the response message, so that the signed response message is prepared using only the challenge message. In another alternate embodiment, the manufacturing provisioning code may prepare the response message by concatenating the challenge message with the trust anchor (with or without the unique ID) to produce the concatenated message.

In block 224, the OEM computer system receives the signed response message (or at least the message signature) from the production electronic circuit. The OEM computer system then verifies the signed response message using the reference electronic circuit. As discussed previously in conjunction with block 215, prior to using the reference electronic circuit to verify the signed response message, the OEM 120 has loaded the reference verification code into the reference electronic circuit (e.g., through the reference circuit board), and the reference electronic circuit has re-generated the secret signature key, if necessary.

According to one embodiment, to verify the signed response message, the OEM computer system and the reference electronic circuit perform a challenge-response message process similar to the previous exchange between the production electronic circuit and the OEM computer system. More specifically, over the communication channel between the OEM computer system and the reference electronic circuit, the OEM computer system sends the reference electronic circuit a challenge message, which in one embodiment may be the signed response message that the OEM received from the production electronic circuit (in block 224), and which is referred to below as the "production signed response message". In some embodiments, the production signed response message may be the same challenge message that the OEM computer system sent to the production electronic circuit in block 222. In other embodiments in which the production electronic circuit modified the challenge message before signing it (e.g., by concatenating its unique ID and/or the trust anchor), the production signed response message will be different from the challenge message that the OEM computer system sent to the production electronic circuit. In still other alternate embodiments, rather than the OEM computer system sending the challenge message to the reference electronic circuit, the challenge message may have been previously stored within the reference electronic circuit, or the reference electronic circuit may derive the challenge message. Either way, the reference verification code of the reference electronic circuit prepares its own response message, referred to below as a "reference signed response message", by causing the message signing logic of the reference electronic circuit to sign the challenge message using the secret signature key generated in block 215. The reference verification code then causes the reference electronic circuit to send the reference signed response message (or at least the message signature) to the OEM computer system.

Upon receiving the reference signed response message (or at least the message signature) from the reference electronic circuit, the OEM computer system performs a comparison between at least the response message signatures received from the production electronic circuit and from the reference electronic circuit. When the comparison is favorable (i.e., the signatures match), the OEM computer system may consider the production electronic circuit to be verified. Otherwise, when the comparison is not favorable (i.e., the signatures do not match), the OEM computer system may determine that the production electronic circuit has not been successfully verified.

According to another embodiment, the reference electronic circuit includes additional verification logic that enables it to verify the production signed response message from the production electronic circuit, and to indicate to the OEM computer system whether or not the production signed response message is verified. In such an embodiment, the OEM computer system sends the reference electronic circuit a challenge message, which in one embodiment may be the production signed response message that the OEM received from the production electronic circuit (in block 224). Once again, in some embodiments, the production signed response message may be the same challenge message that the OEM computer system sent to the production electronic circuit in block 222. In other embodiments in which the production electronic circuit modified the challenge message before signing it (e.g., by concatenating its unique ID and/or the trust anchor), the production signed response message will be different from the challenge message that the OEM computer system sent to the production electronic circuit. In still other alternate embodiments, rather than the OEM computer system sending the challenge message to the reference electronic circuit, the challenge message may have been previously stored within the reference electronic circuit, or the reference electronic circuit may derive the challenge message. Either way, the reference verification code of the reference electronic circuit prepares a reference response message by causing the message signing logic of the reference electronic circuit to sign the challenge message using the secret signature key generated in block 215. The reference verification code then performs a comparison between the reference signed response message (or at least the message signature) which the reference electronic circuit produced) and the production signed response message (or at least the message signature) received from the production electronic circuit via the OEM computer system. When the comparison is favorable (i.e., the signatures match), the reference verification code causes the reference electronic circuit to send a signal or message to the OEM computer system that indicates that the production electronic circuit has been successfully verified. Otherwise, when the comparison is not favorable (i.e., the signatures do not match), the reference verification code causes the reference electronic circuit to send a signal or message to the OEM computer system that indicates that the production electronic circuit has not been successfully verified. Based on the signal or message received from the reference electronic circuit, the OEM computer system may consider the production electronic circuit to be verified or not verified.

The OEM computer system may perform one or more additional processes prior to deeming the production electronic circuit completely acceptable for final provisioning. For example, and according to an embodiment, the OEM computer system may maintain a log of unique IDs for electronic circuits in products that have been previously provisioned. In such an embodiment, if the unique ID of a production electronic circuit is sent to the OEM computer system during the provisioning process, the OEM computer system may determine whether the unique ID received from the production electronic circuit matches any of the previously-stored unique IDs in its log. If so, or if a maximum number of products that include production electronic circuits already have been provisioned by the OEM 120, the OEM computer system may refrain from providing the sensitive production code and/or other sensitive OEM information (referred to collectively herein as "sensitive provisioning information") to the production electronic circuit, regardless of whether or not the signed message was properly verified. Otherwise, when the OEM computer system (or the reference electronic circuit) has properly verified the signed message and has determined that the production electronic circuit corresponding to the unique ID is included in a product that may be provisioned, the OEM computer system downloads the sensitive production code and/or other sensitive OEM information to the production electronic circuit over the provisioning channel, in block 226 (exchange "6" in FIG. 1). According to an embodiment, the provisioning channel is a secure channel during the period in which the sensitive production code and sensitive OEM information is sent to the production electronic circuit. Alternatively, the sensitive production code and OEM information may be encrypted before being sent over the provisioning channel, and subsequently decrypted by the product manufacturer computer system, the production circuit board or the production electronic circuit. In block 228, the manufacturing provisioning code of the production electronic circuit stores the sensitive production code in secure non-volatile memory of the production electronic circuit. At that point, the provisioning channel may be torn down, and the product that includes the production electronic circuit is properly provisioned.

Figure 3:
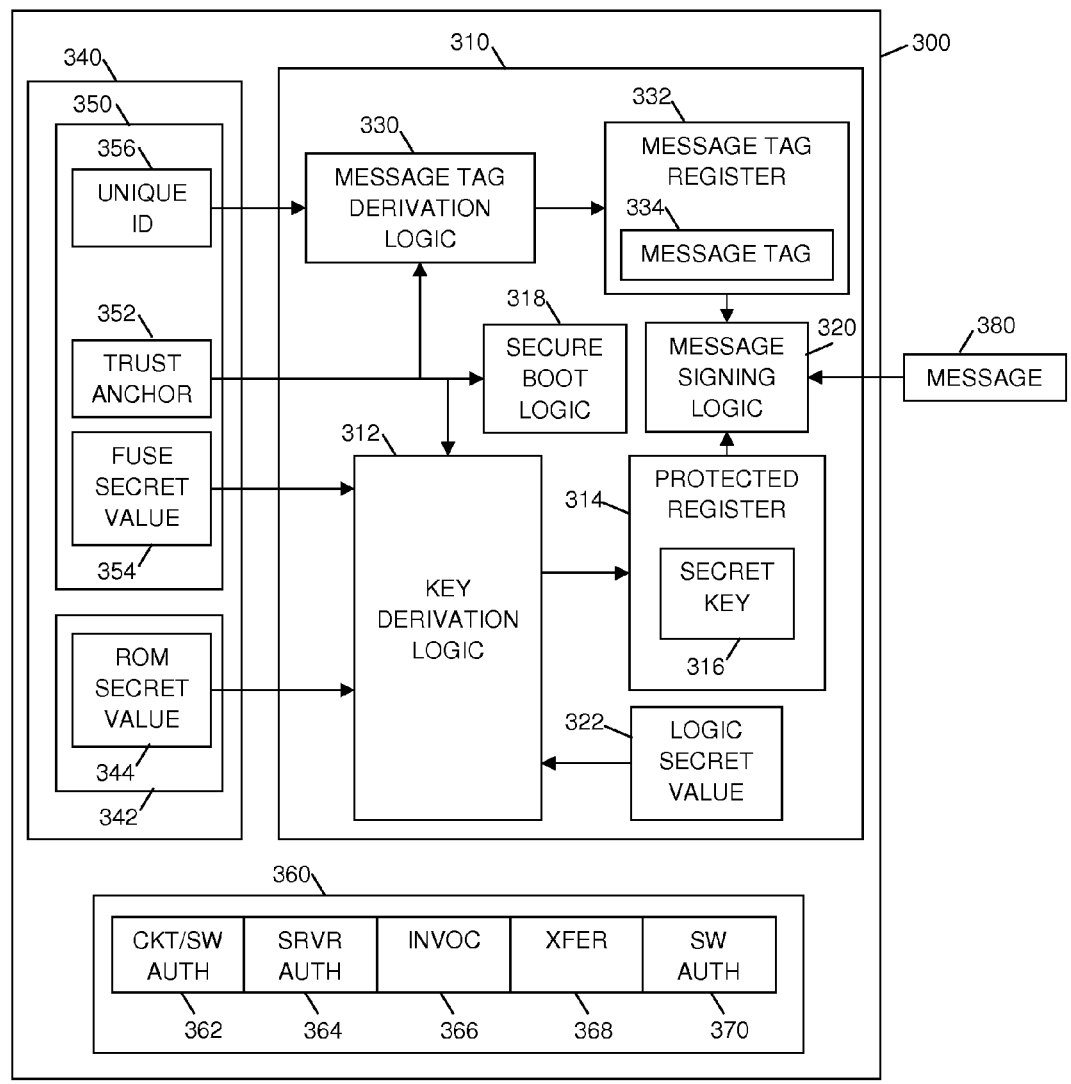
FIG. 3 is a schematic block diagram illustrating an embodiment of an electronic circuit, according to an embodiment.

FIG. 3 is a schematic block diagram illustrating an embodiment of an electronic circuit 300 that enables secure provisioning in a manufacturing process that includes multiple parties (e.g., chip manufacturer 110, OEM 120, and product manufacturer 130, FIG. 1). In an example embodiment, the electronic circuit 300 can be a system on a chip (SOC) based on a suitable processor such as a PowerPC, ARM, or the like. The electronic circuit 300 typically includes one or more processors, an interface to peripherals, memory controllers, a network port such as an Ethernet port, Universal Serial Bus (USB), serial ports, and the like. The electronic circuit 300 can include a cryptographic engine, such as a cryptographic accelerator module that implements the various aspects of the disclosed security protection. The cryptographic engine can include a random number generator, encryption hardware blocks, a hashing hardware block, and other cryptographic functionality.

In general, the electronic circuit 300 includes electronic circuit logic 310, non-volatile storage 340, and memory 360. The electronic circuit logic 310 includes various modules and circuitry configured to perform the core functions of the electronic circuit 300, where functions associated with configuring the electronic circuit 300 and provisioning a product that includes the electronic circuit were described above. It should be noted that FIG. 3 does not depict all modules and circuitry of the electronic circuit 300, but does depict certain modules and circuitry that are helpful to further describe certain embodiments.

As discussed previously, an embodiment of an electronic circuit 300 (or more specifically the electronic circuit logic 310) includes key derivation logic 312 that derives a secret signature key 316 from a plurality of secret and/or immutable values, including at least one value known only to the electronic circuit 300. For example, referring also to FIG. 2, the secret signature key 316 may be derived in blocks 212 and 215 (by the OEM 120) and 218 (by the product manufacturer 130). In an embodiment, the derivation and storage of the secret signature key 316 can be implemented by key derivation logic 312 in conjunction with secure boot logic 318. According to an embodiment, the secure boot logic 318 is permanently read-only and cannot be updated.

Once derived, the secret signature key 316 is stored in a protected register 314 of the electronic circuit 300 (e.g., by the secure boot code executed by the secure boot logic 318). The protected register 314 may be configured to be writable exclusively by the key derivation logic 312 and readable exclusively by message signing logic 320. For example, the values from which the secret signature key 316 is derived may include values embedded in the electronic circuit (e.g., in block 204) and a trust anchor 352 (e.g., the SRKH) stored in the electronic circuit (e.g., in blocks 210 and 216).

According to an embodiment, non-volatile storage 340 includes a plurality of fuses 350 and read only memory (ROM) 342 that may be utilized to store some of the values from which the secret signature key 316 is derived. Alternatively, fuses 350 may be replaced by some other type of configurable set of binary-settable structures (e.g., wire-bonds, DIP switches, and so on). In an embodiment, a fuse secret value 354 and a trust anchor 352 (e.g., an SRKH) may be burned into and reside within fuses 350, as described previously. Further, a ROM secret value 344 may be stored within ROM 342. According to an embodiment, the ROM secret value 344 is readable only during boot, and after boot the ROM secret value 344 becomes unreadable. For example, only the portion of ROM 342 that contains the ROM secret value 344 may become unreadable, or the entire ROM 342 may become unreadable. According to an embodiment, the secret values also may include a logic secret value 322 embedded within the electronic circuit logic 310. For example, the logic secret value 322 may be masked and etched into the electronic circuit logic 310 (i.e., value 322 may be designed into the electronic circuit 300), in an embodiment, in a manner that the logic secret value 322 is unknown and essentially unknowable external to the electronic circuit 300. For example, the logic secret value 322 may be a Register Transfer Level (RTL) secret that is permanently wired into circuit logic 310.

An embodiment of electronic circuit 300 also includes message signing logic 320, which is configured to sign a message 380 received from an external source with the secret signature key 316 (e.g., in block 222 and in some embodiments also in block 224, FIG. 2). Alternatively, the message 380 may be stored within the electronic circuit 300 or internally derived by the electronic circuit 300. When the message signing logic 320 uses the secret signature key 316 to sign a message 380 (e.g., in blocks 222 and in some embodiments block 224, FIG. 2), the trust anchor 352 is cryptographically bound into the signed message by virtue of having been used to derive the secret signature key 316. In some embodiments, the electronic circuit 300 also may include message tag derivation logic 330 that derives a message tag 334, which may be stored in a message tag register 332. For example, the message tag derivation logic 330 may derive the message tag 334 from the trust anchor 352 and/or from a unique ID 356, which also may be burned into fuses 350 or otherwise stored in a non-volatile manner. In some embodiments, the message signing logic 320 can incorporate the message tag 334 in the message 380 that is signed by the message signing logic 320. In either case the trust anchor 352 is cryptographically bound to the signed message.

Among other things, the secure boot logic 318 can be configured to copy secret values to the key derivation logic 312, activate confidentiality protection on copied secret values and the protected register 314, copy the device-unique ID 356 and the trust anchor 352 to the message tag logic 330, activate protection on the message tag register 332, and authenticate off-chip software using the trust anchor 352. According to a further embodiment, the electronic circuit 300 can include additional memory 360 configured to store various software modules, which may be executed by various logic and processing components of the electronic circuit 300. Several example software modules that pertain to the provisioning process are described below. For example, the memory 360 may include a circuit/software authentication (CKT/SW AUTH) module 362, a server authentication (SRVR AUTH) module 364, an invocation (INVOC) module 366, and a transfer (XFER) module 368.

The circuit and software authentication module 362 is configured to authenticate the electronic circuit 300 and software combination to an OEM server using a protocol (e.g., a challenge/response protocol), which may include invoking the message signing logic 320 to sign a message 380 (e.g., in block 222, FIG. 2). Any suitable challenge/response protocol can be used. The circuit and software authentication module 362 may invoke message tagging and signing and may pass messages/signatures between the OEM server and the electronic circuit 300. Essentially, the circuit and software authentication module 362 is configured to perform client authentication that is used to ensure that a product manufacturer may not obtain OEM sensitive data from the OEM server in an unauthorized manner. Inclusion of the trust anchor 352 in secret signature key derivation indirectly authenticates the software via secure boot.

The server authentication module 364 is configured to authenticate an OEM server and to establish a connection (i.e., a provisioning channel) with an authenticated OEM server (e.g., in block 222, FIG. 2). Essentially, the server authentication module 364 is configured to perform server authentication that is used to ensure that a product manufacturer is not able to tamper with OEM sensitive data. For example, Transport Layer Security (TLS) server authentication may be implemented, although other suitable server authentication techniques can be used.

The transfer module 368 is configured to communicate with the OEM server, and may receive sensitive OEM data (e.g., in block 228, FIG. 2), among other things. More specifically, after mutual authentication between the electronic circuit 300 and an OEM server, the transfer module 368 may transfer sensitive OEM data between the OEM server and the electronic circuit 300 over a provisioning channel (e.g., in block 226, FIG. 2). Data received from the OEM can be handled by the transfer module 368 in various ways. For example, the OEM data can be stored in fuses, encrypted and stored off-chip, or used to bootstrap some higher-level security protocol with another server.

The invocation module 366 may be activated by the OEM or a product manufacturer to derive the secret signature key 316, as described previously. In addition, the invocation module 366 may sign messages (e.g., in block 222, FIG. 2) using the derived secret signature key 316 for verification by the OEM (e.g., in block 224, FIG. 2).

Memory 360 also may include software authentication (SW AUTH) data 370. For example, the software authentication data 370 may be dependent on the trust anchor 352 (e.g., the SRKH), and may be used as a reference metric to authenticate OEM-supplied software that will be executed on the electronic circuit 300.

On the OEM side, the OEM server components can include (1) logic to authenticate to client and establish a provisioning channel, (2) logic to communicate with a reference circuit board and a reference electronic circuit; (3) circuit/software authentication logic to run a challenge/response protocol, (4) an audit log to record transactions with clients for auditing or fraud detection using message tags 318 embedded in signed responses, and (5) logic to transmit OEM sensitive data if mutual authentication and a provisioning channel are established.

As discussed previously, after the product manufacturer (e.g., product manufacturer 130, FIG. 1) has received a production electronic circuit 300 from the chip manufacturer (e.g., chip manufacturer 110, FIG. 1), the product manufacturer is required to configure the electronic circuit by storing the correct trust anchor 352 in the electronic circuit 300 (e.g., in block 216, FIG. 2) and run the correct signed production provisioning code (e.g., in block 222, FIG. 2). The production provisioning code communicates with the OEM server (e.g., in block 222, FIG. 2) to obtain sensitive data to be embedded in the product (e.g., in block 228, FIG. 2).

More specifically, the production electronic circuit 300 sends a signed message (or at least a message signature) to the OEM server, and if the OEM server can validate the signed message, the OEM server may send provisioning secrets or other sensitive data to the product manufacturer to be provisioned on the product that includes the production electronic circuit 300 (e.g., in block 222, FIG. 2). If the manufacturer fails to burn the OEM trust anchor 352 correctly, or attempts to generate a signed message using a non-authorized electronic circuit, the secret signature key 316 will not be correct, the signature will fail to verify, and the OEM server will detect an invalid request for the provisioning secrets or other sensitive data.

In embodiments in which the trust anchor 352 is used for secret signature key derivation or when the trust anchor 352 is included as part of the signed message, the OEM server can verify (e.g., in block 224, FIG. 2) that the trust anchor 352 is correct and that the electronic circuit is running signed OEM provisioning software. As discussed previously, in some embodiments, the signed message can include the unique ID 358 to aid in auditing the manufacturing and provisioning processes.

Communications between the OEM server and the contracted manufacturer are typically made over network communication during the manufacturing process. At the end of the manufacturing process and after the OEM has injected the sensitive data, the production electronic circuit may erase the secret signature key so that it may no longer sign messages. The OEM-signed code provisioning code is run only in the manufacturing process and is generally replaced with OEM-signed production code that is sent into the field in the product. The production code may delete the secret signature key so that a product in the field cannot participate in a further authentication process.

Figure 4:
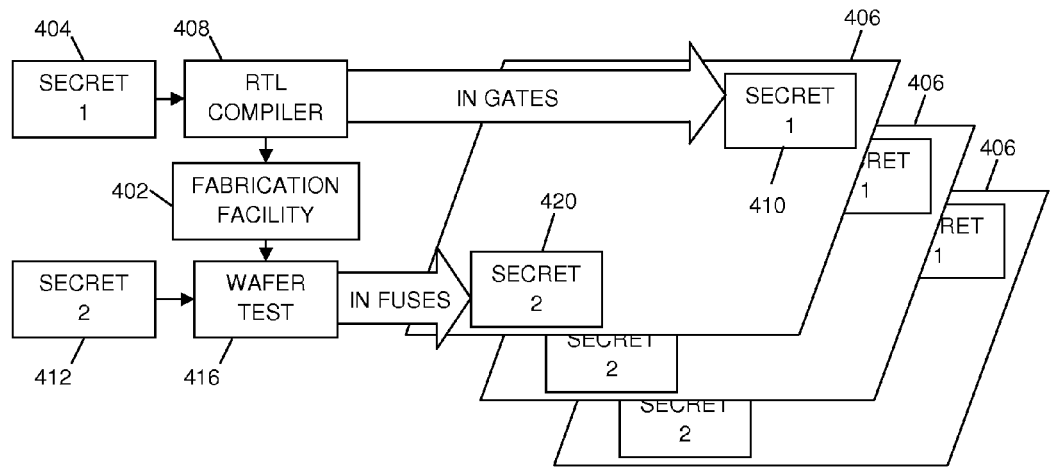
FIG. 4 is a schematic block diagram illustrating manufacturing processes performed by an electronic circuit manufacturer, according to an embodiment.

FIG. 4 is a schematic block diagram illustrating manufacturing processes performed by an electronic circuit manufacturer (e.g., chip manufacturer 110, FIG. 1), according to an embodiment. At the electronic circuit design and fabrication facility 402 (e.g., a facility of chip manufacturer 110, FIG. 1), a common first secret value 404 (e.g., logic secret value 322, FIG. 3 or "secret 1", which may be a value generated by a random number generator (RNG)) is built into the hardware of every copy 406 of an electronic circuit. The first secret value 404 can be applied at the fabrication facility 402 via an RTL compiler 408, for example. According to an embodiment, the first secret value 404 is applied to logic gates 410 of the electronic circuit 406 and is to be completely unknown and unknowable outside the hardware. Also at the electronic circuit design and fabrication facility 402, a second secret value 412 (e.g., fuse secret value 354, FIG. 3 or "secret 2", which also may be a value generated by an RNG) is burnt into fuses 420 within every copy 406 of the electronic circuit, for example at a wafer test 416 stage. The secret value 412 is preferred to be completely unknown and unknowable except by hardware and secure boot firmware.

Figure 5:
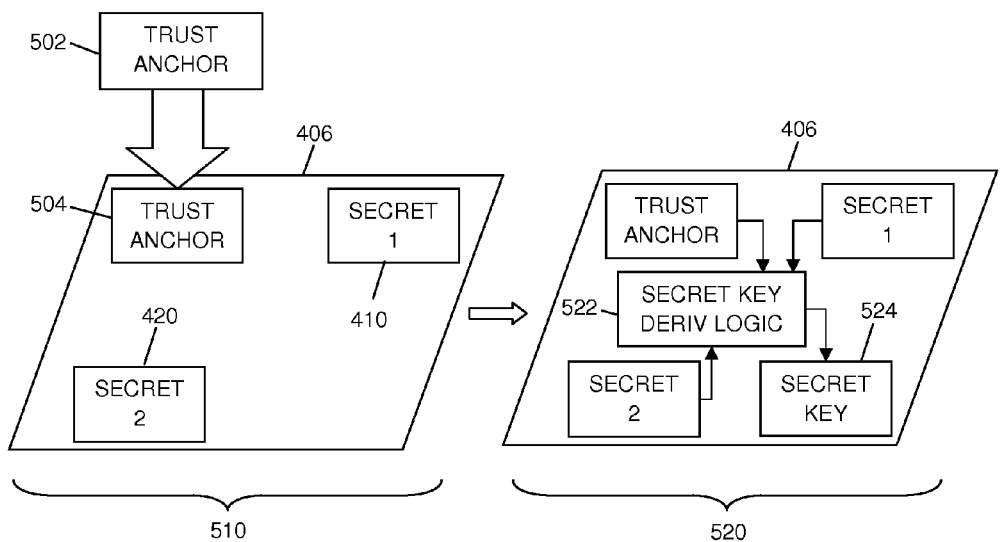
FIG. 5 is a schematic block diagram illustrating manufacturing processes performed by an OEM, according to an embodiment.

FIG. 5 is a schematic block diagram illustrating manufacturing processes performed by an OEM (e.g., OEM 120, FIG. 1), according to an embodiment. After receiving one or more copies of "reference" electronic circuits 406 that have been partially configured (e.g., as depicted in FIG. 4) from the chip manufacturer, the OEM performs several additional steps on each reference electronic circuit 406 to customize the secret signature key at the OEM facility.

More specifically, at stage 510, the OEM configures the electronic circuit 406 with one or more immutable values, such as a trust anchor 502 (e.g., an SRKH), in non-volatile storage 504. At stage 520, the OEM may then invoke key derivation logic 522 on the electronic circuit 406 to derive the secret signature key 524 from the one or more secret values in hardware 410, 420 and the value(s) in non-volatile storage 504.

Figure 6:
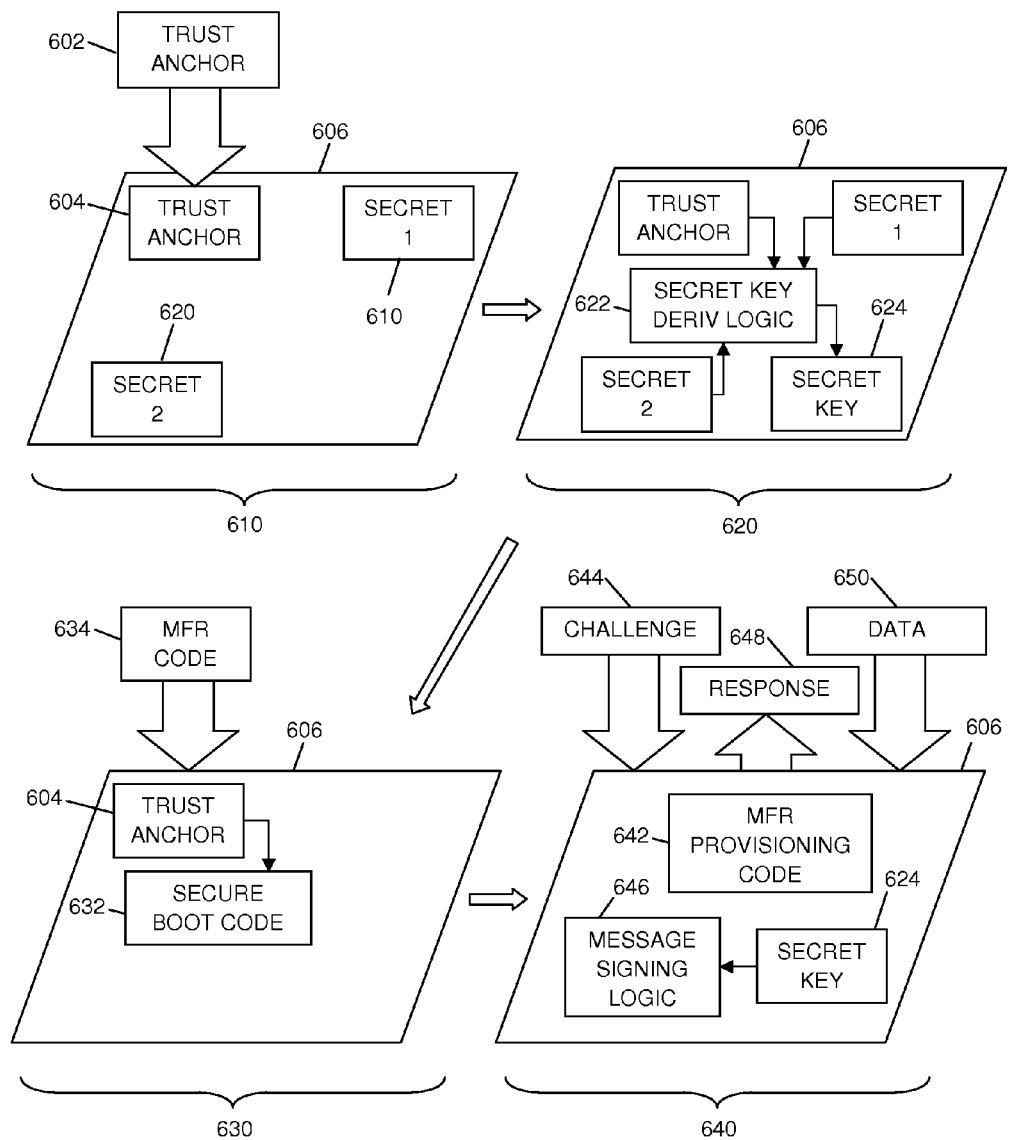
FIG. 6 is a schematic block diagram illustrating manufacturing processes performed by a product manufacturer, according to an embodiment.

FIG. 6 is a schematic block diagram illustrating manufacturing processes performed by a product manufacturer (e.g., product manufacturer 130, FIG. 1), according to an embodiment. The manufacturing process specifically includes a configuration process that the product manufacturer performs on one or more copies of "production" electronic circuits 606 (only one of which is shown in FIG. 6). Presumably, the production electronic circuits 606 are authentic circuits that have been partially configured (e.g., as depicted in FIG. 4) from the chip manufacturer (e.g., with first and second secret values in hardware 410, 420). However, a product manufacturer also or alternatively may attempt to perform the configuration process on one or more non-authentic circuits (e.g., counterfeit circuit copies, circuit copies without the correct stored secrets, and so on). Either way, the product manufacturer performs several steps on each production electronic circuit 606 in a manner that initially is similar to the manner in which the OEM configured the reference electronic circuit 406 (e.g., as depicted in FIG. 5).

More specifically, at stage 610, the product manufacturer configures the electronic circuit 606 with one or more immutable values, such as a trust anchor 602 (e.g., an SRKH), in non-volatile storage 604. To ensure proper configuration of the production electronic circuit 606, the trust anchor 602 should be the same trust anchor 502 as was stored in the reference electronic circuit 406 (FIG. 5). At stage 620, the product manufacturer may then invoke secret key derivation logic 622 on the electronic circuit 606 to derive the secret signature key 624 from one or more secret values in hardware 610, 620 and the value(s) in non-volatile storage 604. To ensure proper configuration of the production electronic circuit 606, the secret values in hardware 610, 620 should be the same as the secret values stored in hardware 410, 420 of the reference electronic circuit 406 (FIG. 5).

At stage 630, secure boot code 632 on the production electronic circuit 606 performs a derivation operation (e.g., a hashing operation) on the code signing public key (e.g., the SRK) supplied by the OEM, and compares the result with the trust anchor 604 stored in the production electronic circuit 606, thus verifying (or authenticating) the code signing public key against the trust anchor 604. In addition, the secure boot code 632 verifies the manufacturing provisioning code signature supplied by the OEM 120 using the code signing public key. Once the secure boot code 632 has verified the code signing public key and the provisioning code signature, the secure boot code 632 launches the manufacturing provisioning code.

At stage 640, the manufacturing provisioning code 642 establishes a provisioning channel with the OEM computer system. Over the provisioning channel, the OEM computer system may send the production electronic circuit a challenge message 644 (or alternatively, the production electronic circuit may know or derive the challenge message 644). Using message signing logic 646 of the production electronic circuit 606 and the secret signature key 624, the manufacturing provisioning code 642 prepares and sends a signed response message 648 (or at least the message signature) back to the OEM computer system over the provisioning channel.

The OEM computer system receives the signed response message 648 (or at least the message signature) from the production electronic circuit 606, and verifies the signed response message 648 using the reference electronic circuit 406 (FIG. 5), which the OEM previously configured. When the OEM computer system (or the reference electronic circuit) has properly verified the signed response message 648, has determined that the production electronic circuit 606 was properly configured, and that the product may be provisioned, the OEM computer system downloads the sensitive production code and/or other sensitive OEM information 650 to the production electronic circuit 606 over the provisioning channel. The manufacturing provisioning code 642 stores the sensitive production code and information in secure non-volatile memory of the product. At that point, the provisioning channel may be torn down, and the product that includes the production electronic circuit 606 is properly provisioned.

An embodiment of a circuit configuration and product provisioning method is performed by a first entity (e.g., a chip manufacturer), a second entity (e.g., an OEM), and a third entity (e.g., a product manufacturer). The method includes embedding, by the first entity, one or more secret values in first and second electronic circuits, where each of the first and second electronic circuits includes key derivation logic and secure boot code. The method further includes generating, by the second entity, a code signing public key, a code signing private key, and a trust anchor, and embedding, by the second entity, the trust anchor in the first electronic circuit. In addition, the second entity activates the secure boot code, which causes the key derivation logic of the first electronic circuit to generate a secret key using a combination of the trust anchor and the one or more embedded secret values. The secure boot code stores the secret key in the first electronic circuit.

The method also includes signing, by the second entity, provisioning code using the code signing private key, resulting in signed provisioning code that includes the provisioning code and a provisioning code signature. The second entity sends the code signing public key, the trust anchor, and the signed provisioning code to the third entity. The third entity embeds the trust anchor in the second electronic circuit, and activates the secure boot code in the second electronic circuit, which causes the key derivation logic of the second electronic circuit to generate the secret key using the combination of the trust anchor and the one or more embedded secret values, stores the secret key in the second electronic circuit, verifies the provisioning code signature of the signed provisioning code using the code signing public key, and when the provisioning code signature is verified, launches the provisioning code on the second electronic circuit. The method further includes preparing, by the provisioning code on the second electronic circuit, a first signed message that includes a first message that has been signed using the secret key stored in the second electronic circuit, and a first message signature, and sending at least the first message signature to the second entity.

The second entity verifies the first signed message using the first message signature and the first electronic circuit. The method further includes receiving, by the second electronic circuit over a channel between the second entity and the second electronic circuit, sensitive provisioning information from the second entity. The sensitive provisioning information is stored on the second electronic circuit.

The term "coupled", as may be used herein, includes direct coupling and indirect coupling via another component or element where, for indirect coupling, the intervening component or element does not modify the operation. Inferred coupling, for example where one element is coupled to another element by inference, includes direct and indirect coupling between two elements in the same manner as "coupled".

While the principles of the disclosed system are described above in connection with specific apparatus, it is to be clearly understood that this description is made only by way of example and not as a limitation on scope of the appended claims. The illustrative pictorial diagrams depict structures and process actions in a secure communication process. Although the particular examples illustrate specific structures and process acts, many alternative implementations are possible and commonly made by simple design choice. Actions may be executed in different order from the specific description herein, based on considerations of function, purpose, conformance to standard, legacy structure, and the like.

While the present disclosure describes various embodiments, these embodiments are to be understood as illustrative and do not limit the claim scope. Many variations, modifications, additions and improvements of the described embodiments are possible. For example, those having ordinary skill in the art will readily implement the steps necessary to provide the structures and methods disclosed herein, and will understand that the process parameters, components, configurations, and topologies are given by way of example only. The parameters, components, configurations, and topologies can be varied to achieve the desired structure as well as modifications, which are within the scope of the claims. Variations and modifications of the embodiments disclosed herein may also be made while remaining within the scope of the following claims.

What is claimed is:

1. A circuit configuration and product provisioning method performed by a first entity, a second entity, and a third entity, the method comprising:
   embedding, by the first entity, one or more secret values in first and second electronic circuits, wherein each of the first and second electronic circuits includes key derivation logic and secure boot code;
   generating, by the second entity, a code signing public key, a code signing private key, and a trust anchor;
   embedding, by the second entity, the trust anchor in the first electronic circuit;
   activating, by the second entity, the secure boot code, wherein the secure boot code causes the key derivation logic of the first electronic circuit to generate a secret key using a combination of the trust anchor and the one or more embedded secret values, and stores the secret key in the first electronic circuit;
   signing, by the second entity, provisioning code using the code signing private key, resulting in signed provisioning code that includes the provisioning code and a provisioning code signature;
   sending, by the second entity, the code signing public key, the trust anchor, and the signed provisioning code to the third entity;
   embedding, by the third entity, the trust anchor in the second electronic circuit;
   activating, by the third entity, the secure boot code in the second electronic circuit, wherein the secure boot code causes the key derivation logic of the second electronic circuit to generate the secret key using the combination of the trust anchor and the one or more embedded secret values, stores the secret key in the second electronic circuit, verifies the provisioning code signature of the signed provisioning code using the code signing public key, and when the provisioning code signature is verified, launches the provisioning code on the second electronic circuit;
   preparing, by the provisioning code on the second electronic circuit, a first signed message that includes a first message that has been signed using the secret key stored in the second electronic circuit, and a first message signature;
   sending, by the second electronic circuit, at least the first message signature to the second entity;
   verifying the first signed message by the second entity using the first message signature and the first electronic circuit;
   receiving, by the second electronic circuit over a channel between the second entity and the second electronic circuit, sensitive provisioning information from the second entity; and
   storing the sensitive provisioning information on the second electronic circuit.

2. The method of claim 1, wherein verifying the first signed message by the second entity comprises:
preparing, by the first electronic circuit, a second signed message that includes the first message that has been signed using the secret key stored on the first electronic circuit, and a second message signature;
sending, by the first electronic circuit, at least the second message signature to the second entity;
performing, by the second entity, a comparison between the first message signature and the second message signature; and
when the first and second message signatures match, the second entity determining that the first signed message is verified.

3. The method of claim 1, wherein verifying the first signed message by the second entity comprises:
sending, by the second entity, at least the first message signature to the first electronic circuit;
preparing, by the first electronic circuit, a second signed message that includes the first message that has been signed using the secret key, and a second message signature;
performing, by the first electronic circuit, a comparison between the first message signature and the second message signature; and
when the first and second message signatures match, the first electronic circuit indicating to the second entity that the first signed message is verified.

4. The method of claim 1, wherein the second entity sends the first message to the first electronic circuit.

5. The method of claim 1, wherein the first electronic circuit has knowledge of the first message or derives the first message.

6. The method of claim 1, wherein the code signing public key is a Super Root Key (SRK), and the trust anchor is a Super Root Key Hash (SRKH).

7. The method of claim 1, wherein embedding the one or more secret values in the first and second electronic circuits comprises embedding one or more secret values selected from a value embedded in logic gates, a value burned into a set of fuses, and a value embedded in masked read only memory (ROM).

8. The method of claim 1, wherein embedding the trust anchor comprises burning the trust anchor into sets of fuses of the first and second electronic circuits.

9. A method performed by a first entity, the method comprising the steps of:
generating a code signing public key and a code signing private key;
generating a trust anchor based on the code signing public key;
signing provisioning code using the code signing private key, resulting in signed provisioning code that includes the provisioning code and a provisioning code signature;
sending the code signing public key, the trust anchor, and the signed provisioning code to a second entity;
embedding the trust anchor in a first electronic circuit, wherein the first electronic circuit includes key derivation logic, secure boot code, and one or more embedded secret values;
activating the secure boot code, wherein the secure boot code causes the key derivation logic to generate a secret key using a combination of the trust anchor and the one or more embedded secret values, and to store the secret key in the first electronic circuit;
receiving, from a second electronic circuit that is distinct from the first electronic circuit and within which the trust anchor and the one or more embedded secret values have been embedded by the second entity, a first signed message when the second electronic circuit successfully verifies the provisioning code signature using the code signing public key, wherein the first signed message includes a first message and a first message signature, wherein the first message has been signed using a secret key stored in the second electronic circuit, and wherein the secret key stored in the second electronic circuit was generated by the second electronic circuit using a combination of the trust anchor and the one or more embedded secret values embedded in the second electronic circuit;
verifying the first signed message using the first electronic circuit; and
when the first signed message is verified, sending sensitive provisioning information to the second electronic circuit.

10. The method of claim 9, wherein verifying the first signed message comprises:
receiving, from the first electronic circuit, a second signed message that includes the first message that has been signed using the secret key stored in the first electronic circuit, and a second message signature;
performing a comparison between the first message signature and the second message signature; and
when the first and second message signatures match, determining that the first signed message is verified.

11. The method of claim 9, wherein verifying the first signed message comprises:
sending at least the first message signature to the first electronic circuit; and
receiving an indication from the first electronic circuit that the first signed message is verified.

12. The method of claim 9, wherein the one or more secret values are selected from a value embedded in logic gates of the first electronic circuit, a value burned into a set of fuses of the first electronic circuit, and a value embedded in masked read only memory (ROM) of the first electronic circuit.

13. The method of claim 9, further comprising:
when the first signed message is not verified, refraining from sending the sensitive provisioning information to the second electronic device.

14. The method of claim 9, wherein the first signed message includes a unique identifier of the second electronic circuit, and the method further comprises:
determining whether the unique identifier matches any previously-stored unique identifiers in a log of electronic circuits in products that have been previously provisioned; and
when the unique identifier matches a unique identifier in the log, refraining from sending the sensitive provisioning information to the second electronic circuit.

15. The method of claim 9, wherein the method further comprises:
determining whether a maximum number of products that include electronic circuits have been previously provisioned; and
when the maximum number of products have been previously provisioned, refraining from sending the sensitive provisioning information to the second electronic circuit.

16. A method performed by a first entity, a first electronic circuit associated with the first entity, and a first computer system associated with the first entity, the method comprising the steps of:
- receiving, from a second entity that has a second electronic circuit that is distinct from the first electronic circuit, a code signing public key, a trust anchor, and signed provisioning code that includes provisioning code and a signature;
- embedding the trust anchor in the first electronic circuit, which includes key derivation logic, secure boot code, and one or more embedded secret values; and
- activating the secure boot code in the first electronic circuit, wherein the secure boot code causes key derivation logic of the first electronic circuit to generate a secret key using a combination of the trust anchor and the one or more embedded secret values, stores the secret key in the first electronic circuit, verifies a provisioning code signature of the signed provisioning code using the code signing public key, and when the provisioning code signature is verified, launches the provisioning code on the first electronic circuit;
- preparing, by the provisioning code, a first signed message that includes a first message and a first message signature, wherein the first message was signed using the secret key stored on the first electronic circuit;
- sending at least the first message signature to the second electronic circuit of the second entity;
- receiving sensitive provisioning information from the second entity when the second entity has verified the first signed message using the second electronic circuit; and
- storing the sensitive provisioning information on the first electronic circuit.

17. The method of claim 16, wherein the one or more secret values are selected from a value embedded in logic gates of the first electronic circuit, a value burned into a set of fuses of the first electronic circuit, and a value embedded in masked random access memory of the first electronic circuit.

18. The method of claim 16, wherein embedding the trust anchor comprises burning the trust anchor into a set of fuses of the first electronic circuit.

19. The method of claim 18, further comprising:
- when the value derived from the code signing public key matches the trust anchor embedded in the first electronic circuit, and when the provisioning code signature is verified, the provisioning code receives a challenge message from the second entity, wherein the first signed message includes the challenge message that has been signed using the secret key.

20. The method of claim 19, wherein preparing the signed response message comprises: concatenating together the challenge message and a unique identifier of the first electronic circuit; and
- signing the concatenated message using the secret key to produce the first signed message.

21. An electronic circuit comprising:
- one or more embedded secret values, wherein the one or more secret values embedded in said electronic circuit comprises one or more secret values selected from a value embedded in logic gates of said electronic circuit, a value burned into a set of fuses of said electronic circuit, and a value embedded in masked read only memory (ROM) of said electronic circuit;
- an embedded trust anchor;
- key derivation logic configured by secure boot code in said electronic circuit to generate a secret key using a combination of the trust anchor and the one or more embedded secret values;
- message signing logic configured to prepare a first signed message that includes a first message and a first message signature, wherein the first message has been signed using the secret key; and
- verification logic configured to receive at least a second message signature of a second signed message generated by a second electronic circuit of an external entity which is external to said electronic circuit, to perform a comparison between the first message signature and the second message signature, and when the first and second message signatures match comparison is favorable, to indicate to the external entity that the second signed message is verified, wherein the one or more embedded secret values and the trust anchor also are embedded in the second electronic circuit, and are used by the second electronic circuit to generate the secret key and to prepare the second message signature so that the second message signature will match the first message signature.

22. The electronic circuit of claim 21, wherein:
the trust anchor is burned into a set of fuses of said electronic circuit.

* * * * *